(12) United States Patent
Ahmed

(10) Patent No.: US 7,758,407 B2
(45) Date of Patent: Jul. 20, 2010

(54) VENTILATION CONTROL BASED ON OCCUPANCY

(75) Inventor: Osman Ahmed, Hawthorn Woods, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 65 days.

(21) Appl. No.: 11/757,778

(22) Filed: Jun. 4, 2007

(65) Prior Publication Data

US 2008/0076346 A1    Mar. 27, 2008

Related U.S. Application Data

(60) Provisional application No. 60/847,266, filed on Sep. 26, 2006.

(51) Int. Cl.
*F24F 11/00* (2006.01)
*F24F 7/06* (2006.01)

(52) U.S. Cl. .............. 454/256; 454/229; 700/276; 700/277; 340/632

(58) Field of Classification Search .............. 454/229, 454/256, 239; 700/276, 277, 278; 340/632
See application file for complete search history.

(56) References Cited

U.S. PATENT DOCUMENTS

| | | | |
|---|---|---|---|
| 5,550,752 A * | 8/1996 | Federspiel | 700/277 |
| 6,196,468 B1 * | 3/2001 | Young | 236/46 R |
| 6,247,919 B1 * | 6/2001 | Welz et al. | 431/13 |
| 6,578,770 B1 * | 6/2003 | Rosen | 236/49.3 |
| 6,645,066 B2 * | 11/2003 | Gutta et al. | 454/229 |
| 6,916,239 B2 * | 7/2005 | Siddaramanna et al. | 454/256 |
| 6,919,809 B2 * | 7/2005 | Blunn et al. | 340/632 |
| 7,438,079 B2 * | 10/2008 | Cohen et al. | 137/3 |
| 2002/0134849 A1 * | 9/2002 | Disser | 236/47 |
| 2003/0146289 A1 * | 8/2003 | Sekhar et al. | 236/49.3 |
| 2004/0144849 A1 * | 7/2004 | Ahmed | 236/1 E |
| 2005/0040943 A1 * | 2/2005 | Winick | 340/539.1 |
| 2005/0099270 A1 * | 5/2005 | Diorio et al. | 340/10.51 |
| 2005/0154494 A1 * | 7/2005 | Ahmed | 700/275 |
| 2005/0258260 A1 * | 11/2005 | Ahmed | 236/51 |

FOREIGN PATENT DOCUMENTS

JP       06147574 A  *  5/1994

* cited by examiner

*Primary Examiner*—Steven B McAllister
*Assistant Examiner*—Patrick F. O'Reilly, III
(74) *Attorney, Agent, or Firm*—Thomas J. Burton

(57) ABSTRACT

An arrangement for use in an occupancy-based ventilation system includes a plurality of CO2 sensors and a processing circuit. The plurality of CO2 sensors are disbursed throughout a plurality of spaces in a building. The processing circuit is operably coupled to receive information representative of CO2 measurements generated by the plurality of CO2 sensors. The processing circuit is operable to determine a value corresponding to occupancy, based on information from the CO2 sensors, and to control the flow of fresh supply air into the building ventilation system based on the determined value.

11 Claims, 6 Drawing Sheets

VENTILATION CONTROL BASED ON OCCUPANCY

This application claims the benefit of U.S. Provisional Patent Application Ser. No. 60/847,266, filed Sep. 26, 2006, which is incorporated herein by reference.

FIELD OF THE INVENTION

The present invention relates generally to building control systems, and more particularly, building control systems that control at least some aspects of ventilation throughout a building.

BACKGROUND OF THE INVENTION

Most building control systems or building automation systems operate to provide ventilation in the spaces of a building. Ventilation is important because living occupants within a building utilize the available oxygen in the ambient air over time through respiration. In addition, work equipment and/or work materials can add irritating or harmful chemicals to the air being respirated by the occupants.

For many years, heating, ventilation and air conditioning ("HVAC") systems have provided a mixture of fresh air into the chilled or heated supply air for the building. This supply air flows into the spaces and rooms of a building through ventilation dampers, as is well known. HVAC systems can increase or decrease the mixture of fresh air into the supply air based on control variables. Currently, the mixture of fresh air is controlled based on measurements taken in the return air of a building system. If the return air is relatively low in oxygen content (or high in $CO_2$ or CO content), then the mixture of fresh air may be increased. If the oxygen content is adequate, however, then the mixture of fresh air may be decreased because it is usually more efficient to perform heating and cooling on recirculated air within the building. In other control systems, the amount of fresh air is preset, and may be keyed to the time of day. For example, the amount of fresh air may be increased during work hours because more people are expected in the building.

While the existing fresh air control schemes in HVAC systems provide some rough control of the fresh air in a building, these schemes are limited. In particular, the existing systems only roughly correlate the need for fresh air with the control of fresh air. Moreover, the needs of the heating and cooling system, and efficiency thereof, may dictate the amount of fresh air that is allowed into the supply air.

Even if there were a way in which to more tightly control the amount of fresh air based on the measured need for fresh air, another drawback arises from the fact that the heated or chilled air is inseparable from the fresh air at the room level. As a consequence, a room may require more fresh air, but not more chilled air. Thus, if additional supply air is admitted to the room for the purpose of providing fresh air, then the temperature may become lower than desired. Conversely, if a particular room requires additional cooling, but does not require further ventilation, then fresh air is unnecessarily directed to spaces in which humans derive no benefit from the fresh air.

There exists a need, therefore, for a method and apparatus for ventilating fresh air into rooms or spaces of a building that addresses one or more disadvantages of the current state of the art discussed above.

SUMMARY OF THE INVENTION

At least some embodiments of the present invention address the above-described need by providing a plurality of MEMS sensors that measure $CO_2$ and controlling ventilation in the building based on a $CO_2$ value from the sensors. Other embodiments determine occupancy based on means other than $CO_2$ sensing and control ventilation in the building based on the occupancy information. Some embodiments allow for ventilation (fresh) air and heating/cooling air to be provided to each space separately, allowing for more granular control in meeting the ventilation and temperature needs of each space.

A first embodiment is an arrangement for use in an occupancy-based ventilation system that includes a plurality of $CO_2$ sensors and a processing circuit. The plurality of $CO_2$ sensors are disbursed throughout a plurality of spaces in a building. The processing circuit is operably coupled to receive information representative of $CO_2$ measurements generated by the plurality of $CO_2$ sensors. The processing circuit is operable to determine a value corresponding to occupancy, based on information from the $CO_2$ sensors, and to control the flow of fresh supply air into the building ventilation system based on the determined value.

In another embodiments, microsystems may be used in other ways to obtain a measurement of occupancy or occupancy-based staleness within the facility. The amount of fresh air may be increased or decreased based on such measurements. In still other embodiments, fresh air may be separately supplied to rooms as a function of occupancy, thereby allowing for additional fresh air without significantly affecting temperature.

The above described features and advantages will become more readily apparent to those of ordinary skill in the art by reference to the following detailed description and accompanying drawings.

DETAILED DESCRIPTION

Figure 1:
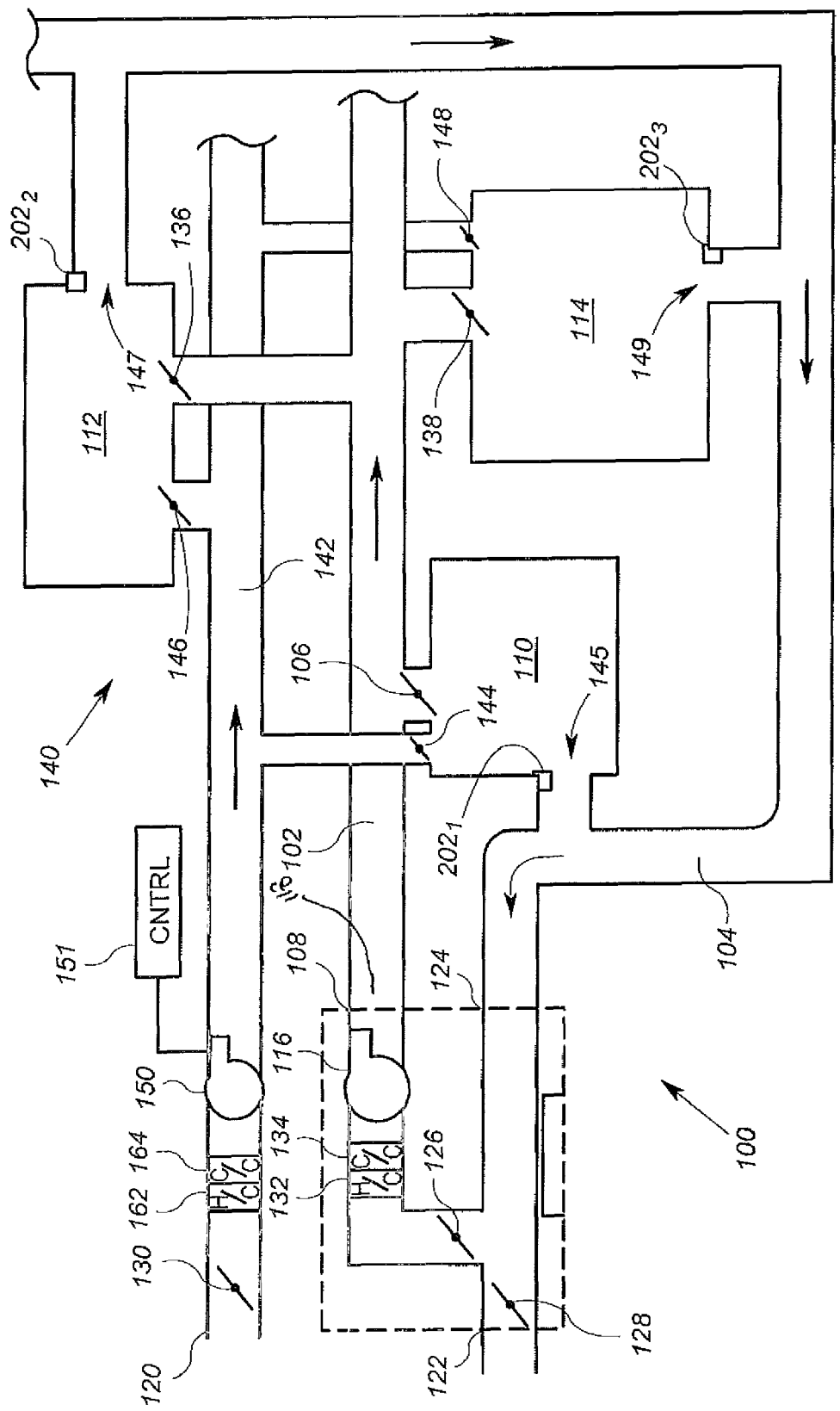
FIG. 1 shows a mechanical schematic view of an exemplary arrangement according to the invention that includes a heating/cooling ventilation system and a separate fresh air ventilation system.

FIG. 1 shows an arrangement according to one embodiment of the invention that includes a portion of a exemplary HVAC system 100 and a portion of a fresh air ventilation system 140. Generally, the HVAC system 100 provides the heating and/or cooling to the building, while the ventilation system 140 provides fresh air to the building.

The portion of the HVAC system 100 illustrated in FIG. 1 includes a first (temperature-controlling air or "TCA") supply duct 102, a first room TCA damper system 106, a second room TCA damper system 136, a third room TCA damper system 138, and an air handling unit 108. The HVAC system 100 provides heated, chilled and/or fresh air throughout a building having a multiplicity of zones, spaces and/or rooms. In general, the chilled air is used in warmer months of the year, and is chilled to a temperature that is below the lowest desirable air temperature within a building. Thus, the chilled air can be used to reduce temperature within a room or space and combat ambient heat sources. Conversely, the heated air is used in the cold months of the year, and is heated to a temperature that is above the highest desirable temperature within a building.

The portion of the fresh air ventilation system 140 illustrated in FIG. 1 includes a fresh air inlet 120, a heating coil 162, a cooling coil 164, a second (ventilation) supply duct 142, a first room ventilation damper system 144, a second room ventilation damper system 146, third room ventilation damper system 148 and a ventilation fan device 150.

In the embodiment described herein, a return air path 104 is shared by both the HVAC system 100 and the fresh air ventilation system 140.

As is known in the art, the HVAC system 100 provides heated or chilled air throughout a building having a multiplicity of zones, spaces and/or rooms. In FIG. 1, only three rooms 110, 112, 114 are shown for purposes of clarity of exposition. However, it will be appreciated that the facility or building may contain several other rooms, spaces and or zones.

The air handler unit 108 is a device that advances air flow through some or all of the HVAC system 100. Some buildings have multiple air handling units. The air handler unit 108 of FIG. 1 includes a supply fan 116, a supply air outlet 118, an exhaust 122, a building return inlet 124, a recirculation damper 126, an exhaust damper 128, an outdoor or fresh air damper 130, a heating coil 132 and a cooling coil 134. In this embodiment, the supply fan 116 is upstream of, and in fluid communication with, the supply air outlet 118. The supply air outlet 118 interfaces to the TCA supply duct 102 of the system 100. The cooling coil 134 is upstream of, and in fluid communication with, the supply fan 116, and the heating coil 132 is upstream of the cooling cool 134.

As will be discussed below, the HVAC system 100 in this embodiment does not require a source of fresh air because the fresh air ventilation system 140 provides all of the fresh air circulation to the rooms. In other embodiments, the HVAC system 100 and/or the air handling unit 108 may include its own fresh air inlet.

The building return inlet 124 is connected to the return path 104 of the building. The return path 104, which may suitably be the plenum space above building ceilings, extends throughout the building and is configured to receive "spent" or exhaust air from various rooms and spaces. The building return inlet 124 is upstream of both the building exhaust 122 and the heating coil 132. The building return inlet 124 is in fluid communication with to the building exhaust 122 via the exhaust damper 128, and is in fluid communication to the heating coil 132 via the recirculation damper 126. The building exhaust 122 is in fluid communication with the outdoor atmosphere. As a consequence, the building exhaust 122 provides an egress port for spent or stale air from the building.

In general, the air handling unit 108 is operable to supply temperature controlled air to the TCA supply duct 102. The supplied TCA air may be heated or chilled recirculated air. As discussed above, however, it is also possible to include a mixture of fresh air to the air handling unit 108 in some embodiments. In such a case, the air handling unit 108 operates primarily with a mix of fresh air and recirculated air.

In any event, the air handling unit 108 supplies chilled air when the temperature of relevant portions of the building needs to be lowered, and supplies heated air when the temperature of relevant portions of the building needs to be raised. However, it will be appreciated that, in some cases, other heating and cooling elements may be used to effect temperature change in localized areas, even though those areas are coupled to receive air heated or chilled by the air handling unit 108. The TCA supply air should have a higher than average temperature when heating, and a lower than average temperature when cooling, as discussed further above, in order to counteract agents contributing adversely to the ambient temperature within the building. Thus, the TCA supply air is called "temperature-controlling" herein because its primary purpose is to change or control the air temperature of various spaces within the building.

The temperature-controlling supply air flows from the air handling unit 108 through the TCA supply duct 102, and may be tapped off at various portions of the building, including by way of example, the rooms 110, 112 and 114. The TCA supply duct 102 is coupled to the first room 110 via the first TCA damper system 106, to the second room 112 via the second TCA damper system 136, and to the third room 114 via the third TCA damper system 138. Other spaces and areas, not shown, are coupled to receive supply air from the supply duct 102 in a similar manner.

The TCA damper systems 106, 136 and 138 are used to regulate the amount of heated or chilled supply air that is provided to the rooms 110, 112 and 114, respectively. The TCA damper systems 106, 136 and 138 are typically controlled independently such that advantageous temperature conditions may be regulated on a room-by-room basis.

By way of example, the amount of heated or chilled supply air that is provided to the room 110 is dependent upon the sensed temperature of the room 110, the desired temperature of the room 110, the temperature of the supply air in the TCA supply duct 102, and the air flow in the TCA supply duct 102. The amount of heated or chilled supply air in other rooms 112, 114 are similarly controlled. Control systems that determine the position and operation of the TCA damper systems 106, 136 and 138 to achieve the desired temperature in their respective rooms are well known in the art. By way of example, FIG. 7, discussed further below, shows a control module 704 capable of controlling the TCA damper 106.

The ventilation system 140 operates in a somewhat similar manner. More specifically, the ventilation fan device 150 is operable to supply air to the fresh air supply duct 142. The supplied air includes primarily, if not completely, fresh air from the fresh air inlet 120. The outdoor or fresh air inlet 120 is in fluid communication with the outdoor atmosphere, and serves as a source of fresh air to the ventilation system 140. The outdoor inlet 120 is located upstream of the heating coil 162 (and thus also the supply fan 150) and is connected to the heating coil 162 via the outdoor air damper 130. It will be appreciated, however, that in some embodiments, some air may be recirculated.

The ventilation fan device 150 supplies fresh air under the control of a control device 151. In accordance with one embodiment of the invention, the control device 151 adjusts the amount of fresh air that ventilation fan device 150 provides based on information regarding the occupancy of the building. Alternatively, or in addition, the control device 151 may be configured to adjust the damper 130 based on information regarding the occupancy of the building. The information regarding occupancy may be a measure of the actual number of persons or living things in the building, a measure of the occupancy-based staleness of the air in the building, or a combination of occupancy-related measurements and/or estimates.

To this end, the rooms 110, 112 and 114 include, among other things, sensors $202_1$, $202_2$, and $202_3$ that detect information corresponding to the occupancy of the room. Further detail regarding exemplary embodiments of the sensors $202_1$, $202_2$, and $202_3$ is provided further below.

In general, the controller 151 cooperates with the ventilation fan device 150 (and possibly the damper 130) to control the flow of fresh air such that the flow increases under higher occupancy levels, and decreases under lower occupancy levels. Accordingly, during working hours within the building, the flow of fresh air will typically be higher than during off-hours. However, in accordance with several embodiments described herein, the information regarding occupancy is obtained through actual measurement, and not based solely on estimates keyed to the time-of-day/day of week. Nevertheless, some embodiments of the invention may combine time-of-day, day-of-week or similar information with actual occupancy-related measurements to obtain an "intelligent" occupancy estimate.

In one example, the ventilation fan device 150 modulates a fan speed to achieve a desired air flow that corresponds to the building occupancy. In other embodiments, the outdoor air damper 130 may be modulated in addition to the fan speed, or in the alternative. Other methods of increasing or decreasing the fresh air flow through the building may be employed.

The controller 151 further controls the operation of the heating coil 162 and cooling coil 164 to effect heating or cooling of the fresh air as necessary to avoid introducing a large temperature changing air flow into the building. In particular, while the purpose of the ventilation system 140 is not necessarily to control the environmental temperature in the building, the temperature of the fresh air provided in the fresh air duct 142 should have a temperature that has little effect on the temperature within the spaces of the building. To this end, the heating coil 162 and cooling coil 164 are employed as necessary to heat or cool the fresh air received from the inlet 120 to an average set point temperature for the building, or at least within a few degrees of the average. Optimally, the fresh air temperature is such that it has minimal impact on the operation of the HVAC system 100. However, in practice there will be some effect.

The amount of air flow required to properly ventilate a building is based on occupancy as well as building size. Guidelines for the amount of fresh air flow per unit occupancy in cubic feet per minute (CFM) per person can be found in the ASHRAE guidelines. The industry standard for fresh air is approximately 25 CFM per person.

In any event, the fresh ventilation air from the ventilation fan device 150 flows through the ventilation supply duct 142, and may be tapped off at various portions of the building, including by way of example, the first room 110. The ventilation supply duct 142 is coupled to the first room 110 via the first ventilation damper system 144. Other spaces and areas are coupled to receive fresh supply air from the ventilation supply duct 142 in a similar manner. To this end, for example, the supply duct 142 is coupled to the second room 112 via the second ventilation damper system 146, and is coupled to the third room 114 via the third ventilation damper system 148.

The first ventilation damper system 144 is configured to regulate the amount of fresh supply air that is provided to the room 110 from the ventilation supply duct 142. Similarly, the ventilation damper systems 146 and 148 are configured to regulate the amount of fresh supply air that is provided to the rooms 112 and 114, respectively, from the ventilation supply duct 142.

The provision of the temperature controlling supply air from the TCA supply duct 102 and the fresh ventilation air from the ventilation supply duct 142 to the various rooms and spaces of the building creates the need to return exhaust air via the return path 104. Each room or space is operably connected to provide exhaust air to the return path 104. (See e.g., the rooms 110, 112, 114). To this end, each room or space has one or more return air vents, for example, return air vents 145, 147, 149 that provide communication between the space and the plenum/return path 104. The return path 104 provides the return air to the outdoor exhaust 122, back to the heating coil 132 for recirculation, or back to a combination of both. The amount of exhaust air that is recirculated, and the amount that exits via the building exhaust 122, is controlled by the dampers 126 and 128.

System Operation

In operation, the HVAC system portion 100 operates to provide heated or chilled air to the rooms 110, 112 and 114 as needed to maintain desirable room temperatures, and the ventilation system 140 provides fresh air throughout the building as needed.

To this end, the air handling unit 108 heats or chills air from the from the building exhaust inlet 124 to generate supply air for the TCA supply duct 102. More specifically, recirculated exhaust air is provided to the heating coil 132, the cooling coil 134 and then the supply fan 116. The heating coil 132 is a device that is operable to perform a heat exchange between a heating medium such as water or steam, and the air flowing to the supply fan 116. To this end, the heating coil 132 has a conduit configured to receive a liquid or steam heating medium. This conduit, not shown, is disposed in a heat exchange area. Such devices are known in the art. The heating coil 132 has an associated valve actuator, not shown in FIG. 1, that controls the flow of the heating medium into the coil 132. Thus, when heating of the supply air is needed, the heating medium is allowed to advance into the heating coil 132. The heat exchange takes place through the transfer of heat from the heating medium to the supply air being drawing through the coil 132 by the supply fan 116.

The cooling coil 134 is a device operable to perform a heat exchange between a cooling medium such as liquid coolant, and the air flowing to the supply fan 116. Like the heating coil 132, the cooling coil 134 has an associated valve actuator, not shown in FIG. 1, that controls the flow of the cooling medium into the coil 134. Thus, when cooling of the supply air is needed, the cooling medium is allowed to advance into the cooling coil 134. The heat exchange may then take to transfer heat from the supply air, thereby cooling the supply air.

The air handling unit 108 is associated with, or contains, a controller that controls the operation of the dampers 126, 128 and 130, and operation of the coils 132 and 134. The controller, not shown, but which is known in the art, controls the dampers 126, 128 and 130 and the coils 132 and 134 to selectively heat or chill the supply air that is provided to the supply duct 102 by the supply fan 116. For example, if the supply air must be warmer, then the heating coil 132 may be filled with the heating medium (steam or hot water). If the outside air temperature is warmer than the exhaust air, then the dampers 126, 128 and 130 may be manipulated to allow more outside air into the mixture that becomes the supply air. As discussed further above, some embodiments will not involve the fresh air inlet 120 and corresponding damper 130 in the air handling unit 108 because the fresh air supply is otherwise controlled by the ventilation fan device 150 and corresponding duct 142. In any event, various schemes for controlling the supply air temperature are known, using dampers configured as shown in FIG. 1, and using heating and cooling coils as shown in FIG. 1.

As discussed above, the ventilation fan device 150 is associated with, connected to, or contains, the ventilation fan controller 151. The controller 151 may suitably be a terminal equipment controller ("TEC") available from Siemens Building Technologies, Inc., which has been programmed to carry out the operations described herein. In this embodiment, the controller 151 controls the flow of fresh air by controlling the fan speed of the ventilation fan device 150. For example, the controller 151 may suitably receive information from the sensors $202_1$, $202_2$, $202_3$ relating to building occupancy and generate an air flow set point therefrom. The controller 151 would then control the ventilation fan device 150 in accordance with the generated set point. In another embodiment, the controller 151 may receive the air flow set point from another processing device, not shown, such as a control station similar to an INSIGHT™ brand control station available from Siemens Building Technologies, Inc. In such a case, the other processing device is configured to generate the set point based on occupancy information generated by the sensors $202_1$, $202_2$, $202_3$. The controller 151 then operates to control the fan speed based on the set point.

As discussed above, the controller 151 also preferably controls the heating coil 162 and cooling coil 164 to effect whatever heating and cooling of the fresh air that is necessary to make the ventilation air temperature a relatively neutral actor in the temperature control strategy of the building. To this end, the controller 151 may control the coils 162, 164 to control the ventilation air temperature such that it is an average of the building temperature, an average or master building temperature set point, or a temperature that is slightly higher than average in cold months and slightly lower in hot months.

Figure 2:
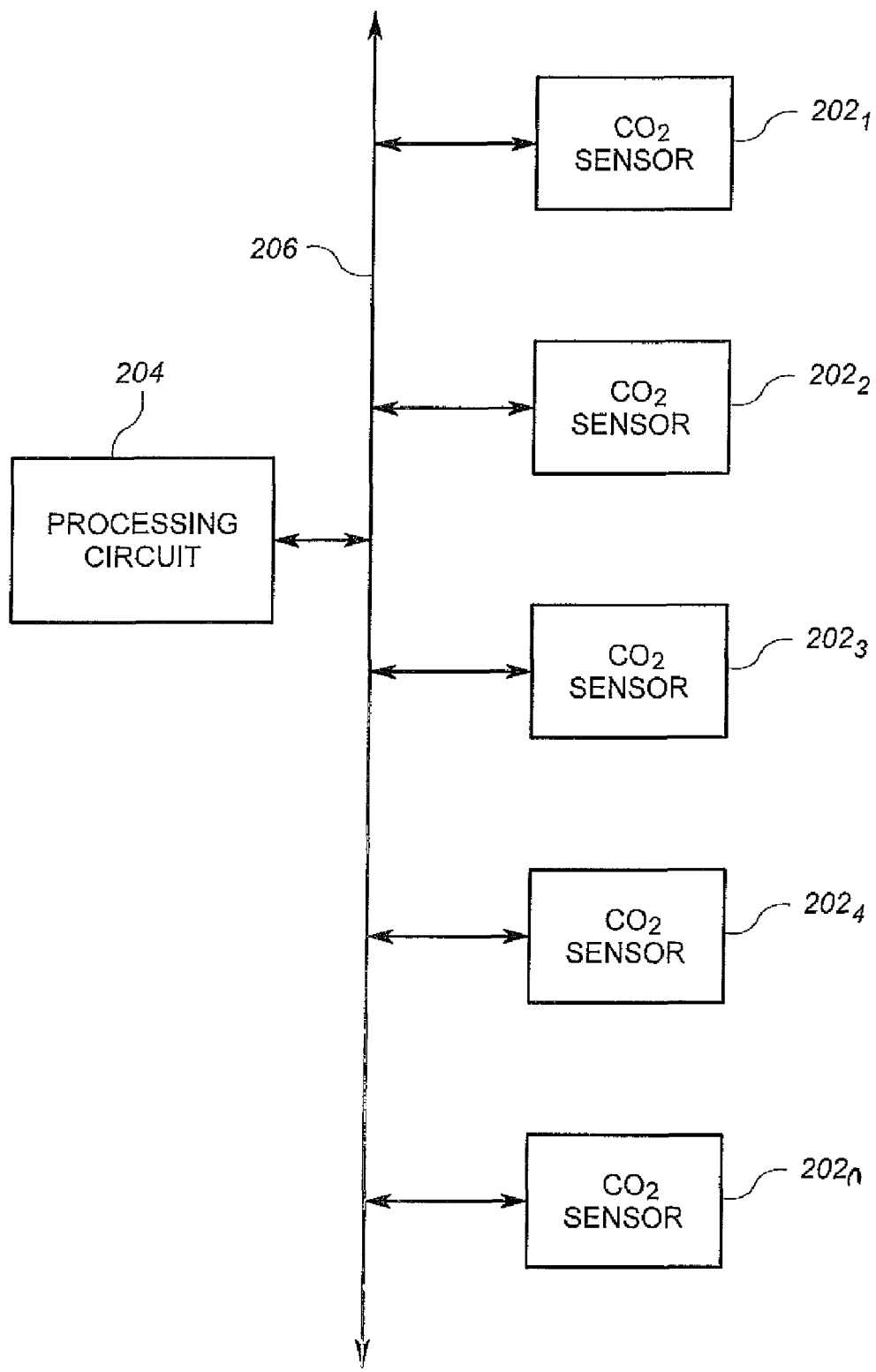
FIG. 2 shows a schematic block diagram of an exemplary arrangement according to the invention.

FIG. 2 shows a schematic diagram of the electrical/electronic operations of the fresh air ventilation control arrangement of FIG. 1. It will be appreciated that only the fresh air ventilation control arrangement, and not the HVAC control arrangement, of FIG. 1 is illustrated schematically in FIG. 2.

As shown in FIG. 2, the sensors $202_1$, $202_2$, $202_3$, as well as sensors $202_4$, and $202n$ from other spaces of the building not shown in FIG. 1, are all operably coupled to provide occupancy-related measurement information to a processing circuit 204 via a communication network 206. In the exemplary embodiment of FIG. 1, the processing circuit 204 may be the controller 151 for the ventilation fan device, or a combination of a control work station and the controller 151 for the ventilation fan device 150, similar to the embodiment of FIG. 4, discussed further below.

The communication network 206 may suitably be one or more communication network devices that facilitate data communication over one or more types of media. The communication network 206 preferably includes at least one wireless link to the sensors $202_1$, $202_2$, $202_3$, as well as sensors $202_4$, and $202_n$. To this end, the communication network 206 may suitably be (or include) a wireless mesh network, such as the one discussed in U.S. patent application Ser. No. 10/672,527, which is incorporated herein by reference. However, in some embodiments, the communication network 206 includes a wired building network, not shown, but which would be known to those of ordinary skill in the art. A suitable example of a well-known building network is an Ethernet network. If the communication network 206 includes a wired network or subnetwork, the communication network 206 would nevertheless include one or more wireless interface devices operable to perform short range wireless communications with the sensors $202_1$, $202_2$, $202_3$, as well as sensors $202_4$, and $202_n$.

In operation, each of the sensors $202_1$, $202_2$, $202_3$, as well as sensors $202_4$, and $202_n$ obtains a measurement that is indicative of occupancy in the space in which they are located. By way of example, each of the sensors $202_1$, $202_2$, $202_3$, as well as sensors $202_4$, and $202_n$ may be a CO2 sensor located near the exhaust vent of the room in which it is located. Referring to FIG. 1, it is noted that the sensor $202_1$ is located proximate to the exhaust air vent 145 of room 110, the sensor $202_2$ is located proximate to the exhaust air vent 147 of room 112, and the sensor $202_3$ is located proximate to the exhaust air vent 149 of room 114.

The CO2 level generated by each sensor at least roughly corresponds to the number of occupants in the room. It is known that living animals such as human beings exhaust CO2. The volume of CO2 generated in a building may be roughly correlated to the number of human occupants, as discussed further above. Thus, the CO2 gas level detected at the exhaust vent (e.g. vents 145, 147 and 149) will generally correlate well to the number of occupants, or at least the gross weight of the occupants.

While it is possible that CO2 gas corresponding to a particular occupant may migrate from the space in which the occupant is located into another room, hall or space, the CO2 level from each sensor at least provides a measure of the "occupancy-related staleness" of each room. For example, consider an example in which the spaces 110 and 114 of FIG. 1 are adjacent, and either share a door or are part of a larger open area). Further consider that the space 114 has four occupants and the adjacent space 110 has one occupant, and yet the CO2 level of the sensor $202_3$ corresponds to three occupants and the CO2 level of the sensor $202_1$ corresponds to two occupants, due to air currents between the spaces 110 and 114. While the measurements of the CO2 sensors $202_1$ and $202_3$ do not provide exact occupancy information regarding the spaces 110 and 114, they nevertheless provide enough information to account for the total occupancy for the two spaces 110, 114. Moreover, the CO2 sensors $202_1$ and $202_3$ provide information that arguably indicates how much fresh air is needed in each of the spaces 110 and 114, regardless of the actual occupancy. Hence, the CO2 sensors $202_x$ in this embodiment provide a measure of occupancy-related staleness.

The CO2 sensors $202_1$, $202_2$, $202_3$, $202_4$, and $202_n$ thus provide a relatively accurate indication of the occupancy level of the building, as well as a relatively accurate indication of the distribution of the occupants. In any event, the CO2 sensors $202_1$, $202_2$, $202_3$, $202_4$, and $202_n$ provide a quantifiable measure of the need for fresh air, based on the occupancy of the building.

It will be noted that in another embodiment, sensors other than CO2 sensors may be used to provide an estimate of occupancy. For example, many buildings require identification cards or badges which may be provided with an RFID device or the like. In such an alternative embodiment, each of the sensors $202_1$, $202_2$, $202_3$, $202_4$, and $202_n$ may include a device that is operable to detect the presence of an RFID tag within the vicinity and use that information to estimate occupancy. While such an alternative could be used and enjoy benefits of the invention, the use of CO2 levels has the added advantage of providing a more accurate measure of the occupancy-based need for ventilation. The CO2 levels provide a correlation in fact of the staleness of the air due to occupancy, and therefore links the need for ventilation directly to the ventilation control. By contrast, a mere occupancy count cannot account for the varying impact that smaller and larger people have on the need for ventilation.

Figure 3:
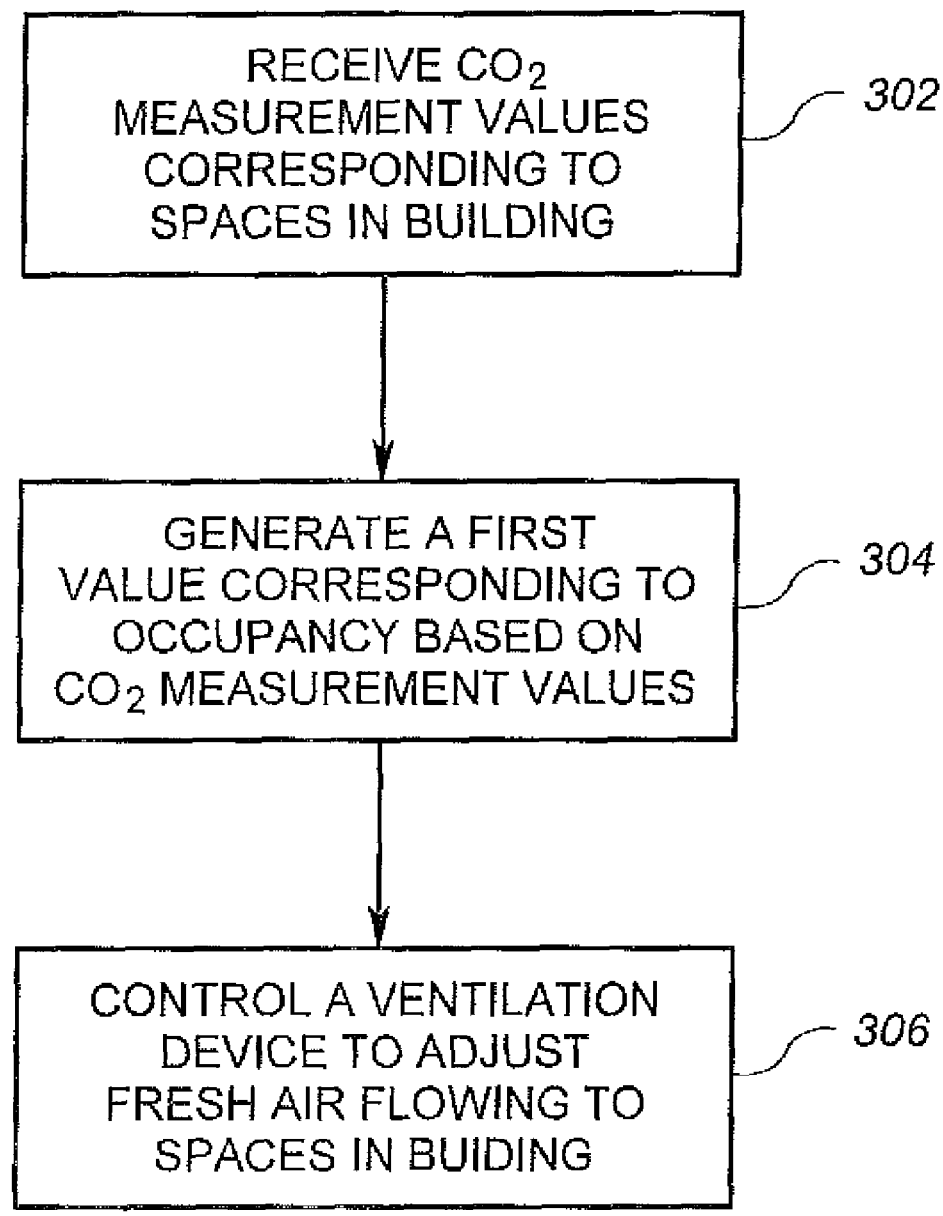
FIG. 3 shows a flow diagram of the operations of the processing circuit of FIG. 2.

In any event, the processing circuit 204 receives the occupancy-related information from the sensors and generates control signals based thereon. In particular, FIG. 3 shows in further detail a set of operations that may be performed by a processing circuit such as the processing circuit 204 of FIG. 2. As discussed above in connection with FIG. 2, it will be appreciated that the processing circuit 204 may consist of one or more processing devices, and associated circuitry, in distributed locations or in one location.

In step 302, the processing circuit 204 receives CO2 measurement values of the sensors $202_1$, $202_2$, $202_3$, $202_4$, and $202_n$, or information derived from the measurement values. In step 304, the processing circuit 204 generates a first value corresponding to building occupancy based on the CO2 measurement sensors. The first value may suitably be a sum of the CO2 measurement values of the sensors $202_1$, $202_2$, $202_3$, $202_4$, and $202_n$. In step 306, the processing circuit 204 controls a ventilation device such as the ventilation fan device 150 of FIG. 1 to provide a controlled flow level of fresh air into the building spaces based on the first value.

Steps 302, 304 and 306 are performed repeatedly in an ongoing manner. If the occupancy of the building increases, then the aggregate CO2 level in the building will increase, thereby resulting in a higher first value. When the first value increases by at least a threshold amount, the processing circuit 204 in step 306 causes the ventilation fan device 150 to increase the flow of fresh air. By contrast, if the occupancy of the building decreases, then the CO2 level decreases, resulting in a lower first value. When the first value decreases by at least a threshold amount, the processing circuit 204 causes the ventilation fan device 150 to decrease the flow of fresh air.

Figure 4:
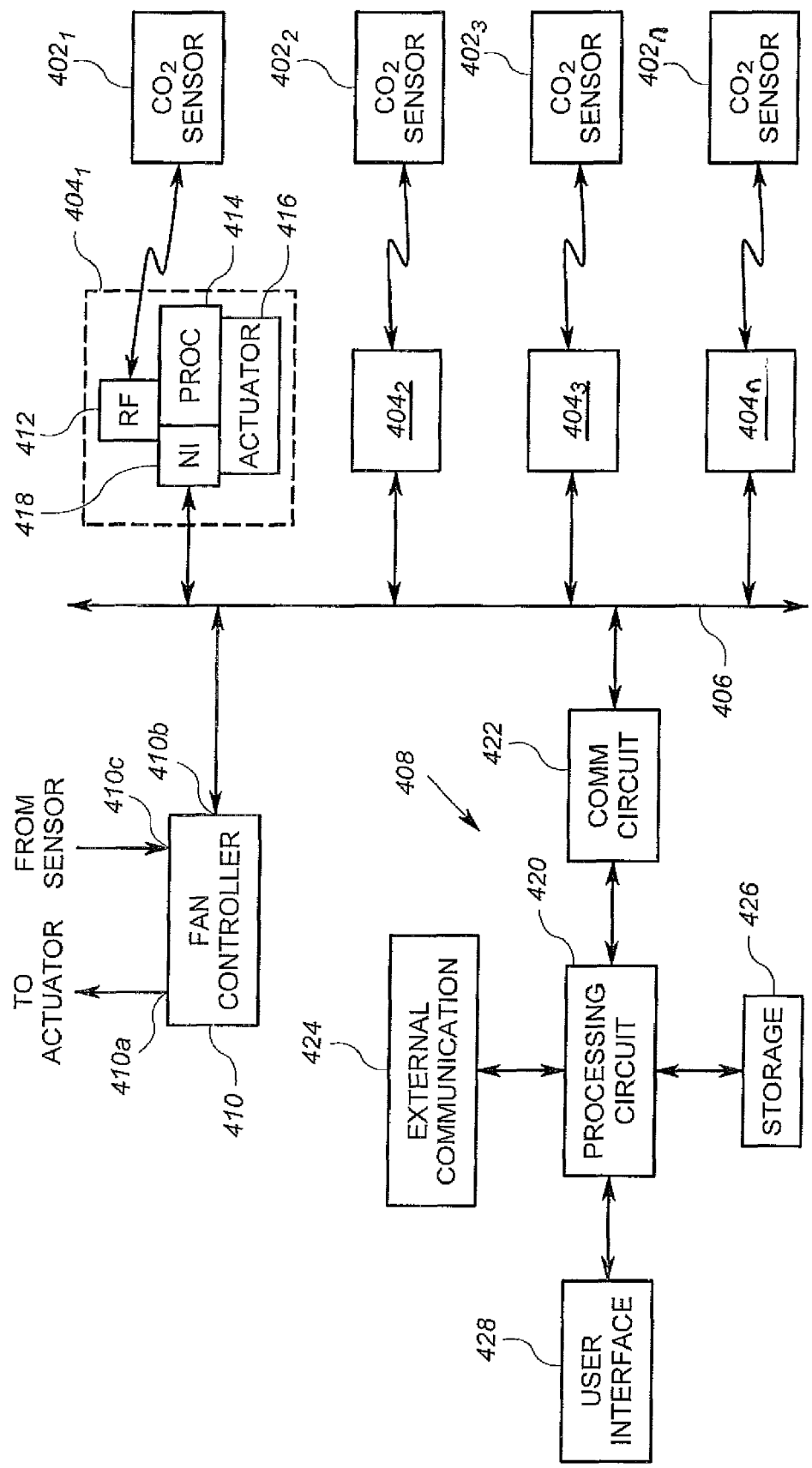
FIG. 4 shows in further detail a schematic block diagram of a first embodiment of the arrangement of FIG. 2.

FIG. 4 shows in further detail a specific implementation of the arrangement of FIG. 2. The arrangement of FIG. 4 includes a plurality of wireless CO2 sensor modules $402_1$, $402_2$, $402_3$, and $402_n$, a plurality of actuator modules $404_1$, $404_2$, $404_3$, and $404_n$, a communication network 406, a control station 408, and a variable fan speed controller 410. Each of the plurality of wireless CO2 sensor modules $402_1$, $402_2$, $402_3$, and $402_n$ is operably configured to communicate wirelessly with a corresponding actuator module $404_1$, $404_2$, $404_3$, and $404_n$.

Figure 5:
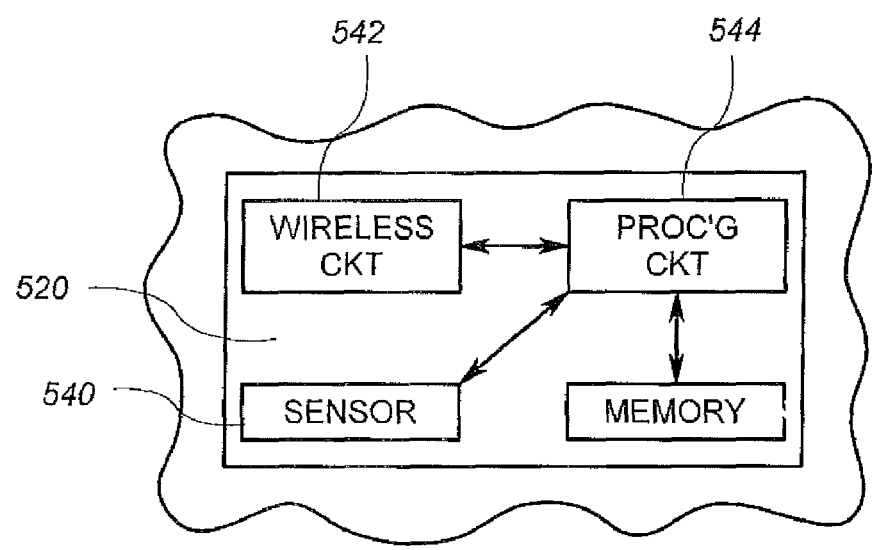
FIG. 5 shows a schematic block diagram of an exemplary sensor module according to embodiments of the invention.
Figure 6:
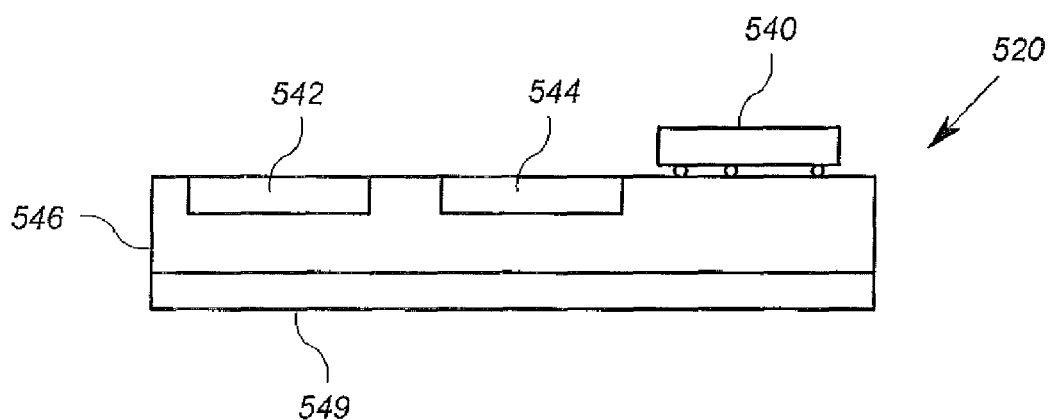
FIG. 6 shows a representative side cutaway view of the sensor module of FIG. 5.

Each of the wireless CO2 sensors $402_1$, $402_2$, $402_3$, and $402_n$ is disposed in an area in a location in which CO2 content of the area may be reasonably measured. For example, it is advantageous to include a CO2 sensor at substantially every return air path vent, such as the vents 145, 147 and 149 of FIG. 1. Placed at every return air path, a measure that corresponds to approximately all of the CO2 circulating in the building may be obtained. Each wireless CO2 sensor $402_1$, $402_2$, $402_3$, and $402_n$ is operable to communicate the CO2 information at least locally using wireless communications, such as, for example Bluetooth communication technology. While the sensor modules $402_1$, $402_2$, $402_3$, and $402_n$, may take many forms, FIGS. 5 and 6 show a general architecture that may be used.

Each of the actuator modules $404_1$, $404_2$, $404_3$, and $404_n$ is coupled to the communication network 406. The coupling between the actuator modules $404_1$, $404_2$, $404_3$, and $404_n$ and the communication network 406 may be wired or wireless. In this embodiment, each of the actuator modules $404_1$, $404_2$, $404_3$, and $404_n$ is operable to act as a network interface between the corresponding CO2 sensor module $402_1$, $402_2$, $402_3$, and $402_n$ and the control station 408, and is further operable to perform localized control of one or more aspects of the room ventilation.

By way of example, the actuator module $404_1$ in this embodiment includes a wireless communication circuit 412, a processing circuit 414, an actuator 416 and a network interface 418. The wireless communication circuit 412 may take any suitable form that is compatible with the wireless communication scheme of the CO2 sensor $402_1$. Thus, the wireless communication circuit 412 is operable to transmit and receive signals to and from the CO2 sensor module $402_1$.

The processing circuit 414 may suitably be any processor or controller circuit suitable for use in performing PID or other types of control algorithms. The processing circuit 414 is further configured or programmed to carry out other operations as described herein. The processing circuit 414 is operably coupled to exchange data and signals with the wireless communication circuit 412, the actuator 416 and the network interface 418. The actuator 416 is preferably a known device that is configured to controllably open and close (i.e. modulate) a ventilation damper, such as the ventilation damper of the damper system 144. (See, for example, FIG. 7).The network interface 418 is a circuit that is configured to interface with the communication network 406.

The actuator module $404_1$ as described above may suitably have an architecture similar to the control module 202 and/or the actuator module 208 of U.S. patent application Ser. No. 10/672,527. However, it will be appreciated that the design of the communication circuit 412, the processing circuit 414, the actuator 416 and the network interface 418 will vary from system to system based on need and design choice. The actuator module $404_1$ may suitably include other elements, not discussed herein. The actuator modules $404_2$, $404_3$, and $404_n$ preferably have a similar structure to that of the actuator module $404_1$.

The communication network 406 may suitably be a wireless network similar to that described in connection with FIG. 1 of U.S. patent application Ser. No. 10/672,527. In the alternative, the communication network 406 may comprise any combination of data networks including an Ethernet network, ring network, or the like.

The control station 408 includes a processing circuit 420, a communication circuit 422, an external communication circuit 424, one or more storage devices 426, and user interface devices 428. The communication circuit 422 is a device operable to interface between the communication network 406 and the processing circuit 420. The processing circuit 420 may suitably be the main circuitry of a general purpose computing device. The processing circuit 420 is programmed and/or otherwise configured to carry out the operations described herein. It is contemplated that the processing circuit 420 may perform several other functions unrelated to the ventilation control described herein. For example, processing circuit 420 may also perform supervisory control and monitoring functions for an HVAC system such as the HVAC system 100 of FIG. 1.

The storage devices 426 may suitably be one or more hard disk drives, removable memory, flash memory, or other data memory devices. The user interface 428 includes typical user interface equipment such as a video display monitor, a keyboard, and a pointing device.

The fan controller 410 may suitably be a terminal equipment controller ("TEC") or modular equipment controller ("MEC") available from Siemens Building Technologies, Inc., a fan controller that is integral to a ventilation fan device, or any other suitable equipment control device. In the embodiment described herein, the fan controller 410 is operable to modulate the output of a ventilation fan in order to achieve a set point flow value. To this end, the fan controller 410 includes an output 410a for providing actuator control signals to adjust operation of a ventilation fan, a communication input 410b operably connected to the communication network 406, and a sensor input 410c for receiving a feedback signal representative of the actual flow of the ventilation fan.

In operation, each of the sensors $402_1$, $402_2$, $402_3$ and $402_n$ measure the CO2 content and provide information indicative of the CO2 content to the corresponding actuator module $404_1$, $404_2$, $404_3$, and $404_n$. The actuator modules $404_1$, $404_2$, $404_3$, and $404_n$ receive the information and generate a room CO2 content-related value therefrom. The content-related value may be a sum of CO2 measurements taken within a room. In particular, it is possible that an actuator module $404_x$ is located within a room that has multiple CO2 sensors. In such as case the acutator module $404_x$ adds the multiple CO2 measurements to obtain a room CO2 value. In another embodiment, each actuator module $404_x$ performs a conversion that approximates the number of occupants in the room based on the CO2 sensor value. However, in the embodiment described herein, each actuator module $404_x$ generates a CO2 value representative of the sum of any corresponding sensor in the same space or room.

Referring specifically to the actuator $404_1$, the RF circuit 412 receives a signal from the CO2 sensor $402_1$. The received signal includes information regarding a CO2 measurement generated by the CO2 sensor $402_1$. The RF circuit 412 and the processing circuit 414 then cooperate to extract the CO2 measurement information from the received signal. Because the CO2 sensor $402_1$ is the only CO2 sensor in the room, the CO2 measurement represents the CO2 measurement for entire room.

The processing circuit 414 may further process the information, as discussed above, but in any event generates a CO2 value for transmission to the control station 408. The network interface 418 obtains the CO2 value, packaged in the communication protocol information, from the processing circuit 414 and transmits a CO2 value message to the communication circuit 422 of the control station 408 via the communication network 406. The other sensors $402_2$, $402_3$, and $402_n$ and actuators $404_2$, $404_3$, and $404_n$ operate in a similar manner.

Thus, each of the actuators $404_1$, $404_2$, $404_3$, and $404_n$ provides the CO2 value to the control station 408 via the communication network 406. The processing circuit 420 receives all of the CO2 values, via the communication circuit 422, from the actuators $404_1$, $404_2$, $404_3$, and $404_n$. In this embodiment, the processing circuit 420 generates an aggregate CO2 value based on the received CO2 values. The aggregate CO2 value is suitably the sum of the CO2 values from the actuators $404_1$, $404_2$, $404_3$, and $404_n$. Accordingly, the aggregate CO2 value represents a measure of the CO2 level of the building. As discussed above, the CO2 level correlates to the occupancy of the building.

The processing circuit 420 then adjusts the flow set point (desired flow) of the ventilation fan based on the occupancy-related CO2 level. To this end, the processing circuit 420 may employ a control algorithm, a look-up table, or equation that relates occupancy-related CO2 level for a building with a ventilation (fresh air) flow value. The processing circuit 420 may also generate an occupancy estimate, which may or may not be used in the generation of the flow set point.

The processing circuit 420 may also store the various CO2 levels and/or occupancy calculations in the storage devices 426. The stored information may be later accessed and/or may be used for logging, trending, traffic, security and other analysis. The processing circuit 420 in some embodiments makes the individual CO2 values, the aggregate CO2 value, and/or the occupancy calculations available for remote access via the external communication circuit 424. The same information is made available locally through the user interface 428.

In any event, the processing circuit 420 provides the flow set point to the fan controller 410 via the communication circuit 422 and the communication network 406. The fan controller 410 receives the flow set point and the actual flow sensor value via the sensor input 410c. The fan controller 410 then uses a PID control algorithm or a more advanced learning control algorithm to bring the ventilation fan output to the desired flow set point.

Thus, the above operations take the CO2 measurements from the sensors 4021, $402_2$, $402_3$, and $402_n$ and adjust the ventilation air flow based thereon.

Figure 7:
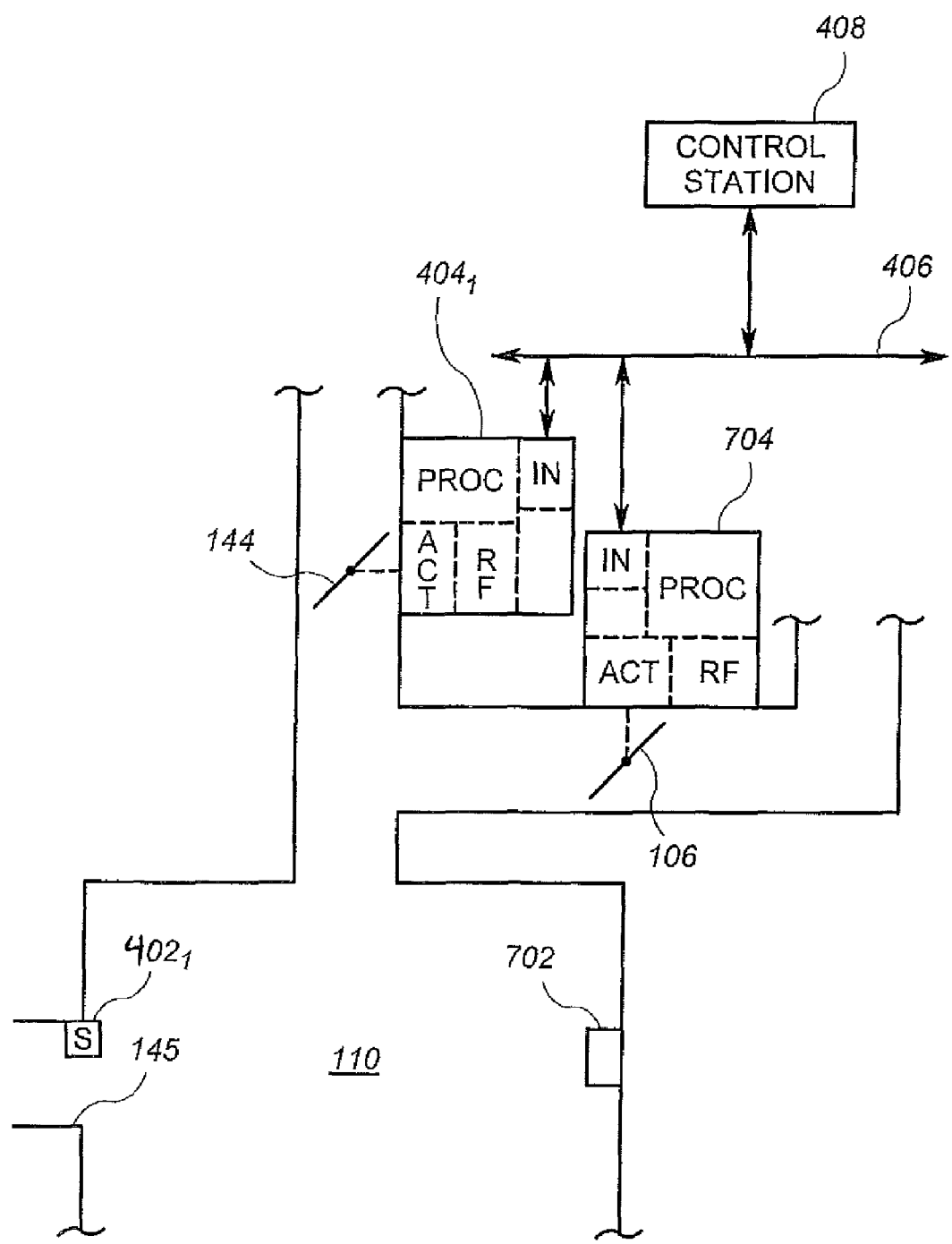
FIG. 7 shows a schematic block diagram of an exemplary control arrangement for ventilation and heating/cooling of the room of FIG. 1.

In addition, the actuator modules $404_1$, $404_2$, $404_3$, and $404_n$ are further configured to control the position of their corresponding ventilation damper based on the local CO2 value. For example, the actuator module $404_1$ is configured to further open or further close the ventilation damper (e.g. damper of the damper system 144 of FIG. 1 as shown in FIG. 7) based on the CO2 value received from the sensor module $402_1$. If the CO2 value increases, indicating increased staleness in the room or space, then the processing circuit 414 causes the actuator 416 to further open the ventilation damper. The increased staleness may result from an increase in the number of people occupying the room. If the CO2 value decreases, indicating a decreased staleness, then the processing circuit 414 causes the actuator 416 to further close the ventilation damper. By closing the ventilation damper, the fresh air flow is conserved for the spaces requiring more ventilation.

It will be appreciated that in the embodiment described above, the heating and cooling operations are typically carried out by a separate ventilation damper and system, similar to that described above in connection with FIG. 1. For example, FIG. 7 show the controller $404_1$ controlling the ventilation damper system 144 for the first room 110 of FIG. 1, and a similar controller 704 for controlling the heating/cooling (TCA) damper 106 for the room 110 of FIG. 1. As is known in the art, the control of the TCA damper 106 is carried out based on measured temperature information received via at least one temperature sensor 702 disposed within the room 110. However, it is contemplated that the systems of FIGS. 1, 2 and 4 may be incorporated into a HVAC ventilation damper system itself.

FIGS. 5 and 6 show an exemplary embodiment of a sensor module 520 that may be used as any of the sensor modules $202_1$, $202_2$, $202_3$, etc., and $402_1$, $402_2$, $402_3$, and $402_n$.

In order to detect or obtain the CO2 content, the sensor module 520 includes a sensor device 540 that is configured to measure the CO2 levels. (See FIG. 5). Such measurement devices are known in the art. The sensor module 520 further includes a wireless communication circuit 542 operable to communicate the measurement information (or information derived therefrom) to a remotely located wireless communication circuit, such as the RF circuit 412 of FIG. 4, or some other wireless device of the communication network 206 of FIG. 2.

In the embodiment described herein, the sensor device 540 is preferably one or more microelectromechanical system sensors or MEMS sensors, including a CO2 MEMs sensor. Such sensors are known. MEMS sensors have the advantage of requiring relatively little space and electrical power, and have relatively little mass. A CO2 MEMS sensor can readily fit onto small footprint. In some embodiments, multiple MEMS sensors may be used in the sensor device, such as temperature, flow, humidity, light, sound or motion sensors. Such other sensors may provide information to other systems through the same communication path. In addition, a MEMS flow sensor on the device may be used in conjunction with the $CO_2$ sensor to obtain the $CO_2$ measurement for the room. In particular, if air is flowing quickly, then the $CO_2$ measurements may be lower over time as compared to a situation in which the air is static. Thus, actual occupancy can be a function of both measured $CO_2$ levels and flow.

In any event, it is preferable if the communication circuit 542 and the processing circuit 544 are incorporated onto the same substrate as the sensor device 540. To this end, on-chip Bluetooth communication circuits are known. In addition, methods of attaching MEMS devices to semiconductor substrates is known, such as is taught in connection with FIG. 8 of U.S. patent application Ser. No. 10/951,450 filed Sep. 27, 2004 and which is incorporated herein by reference. FIG. 6 shows a side view of an exemplary sensor module 520 wherein the various components are incorporated into one chip.

The processing circuit 544 is operable to generate digital information representative of the sensed quantities and prepare the information in the proper protocol for transmission.

Referring to FIG. 6, an advantageous embodiment of the sensor module 520 is a semiconductor substrate 546 having the processing circuit 544 and the communication circuit 542 formed thereon, and a MEMS sensor device 540 attached thereto, such as by flip-chip bonding. In addition, it would be advantageous to attach a power source such as a battery to the substrate 546. The battery may suitably be a lithium ion coin cell type structure 549 affixed to the side of the semiconductor substrate 546 opposite the processing circuit 544 and communication circuit 542. It will be appreciated that if a suitable communication circuit cannot be formed in the semiconductor substrate 546, it too may be separately formed and then attached via flip-chip or similar type of bonding.

It will be appreciated that the above described embodiments are merely exemplary and that those of ordinary skill in the art may readily devise their own implementations and modifications that incorporate the principles of the present invention and fall within the spirit and scope thereof. In one alternative embodiment, the $CO_2$ sensors are replaced by MEMs radar-based motion sensors, or MEMs RFID tag detectors. In the case of RFID tag detectors, it is assumed that substantially all building occupants will have ID tags that can carry the RFID devices. In the alternative, the processing circuit 204 of FIG. 2 determines an appropriate flow set point based on the occupancy of the building. If occupancy measurements increase, then the flow is increased accordingly. If the measured occupancy decreases, then the flow is decreased accordingly. Both alternatives perform ventilation control based on occupancy as opposed to occupancy-related $CO_2$ measurements.

I claim:

1. An arrangement for use in an occupancy-based ventilation system, comprising:
a plurality of $CO_2$ sensors distributed throughout a plurality of spaces in a building, each of the plurality of $CO_2$ sensors incorporated into a wireless sensor module, each of the plurality of $CO_2$ sensors comprising a MEMS sensor, each space having a corresponding first damper configured to regulate a flow of fresh air into the space and a second damper configured to regulate a flow of other air into the space, the other air having a temperature that is different than the fresh air;
at least a first processing circuit operably coupled to receive information representative of $CO_2$ measurements generated by at least a first $CO_2$ sensor corresponding to a first space, the first processing circuit operable to control the flow of fresh air into the first space via the first damper of the first space based on the $CO_2$ measurements generated by the first $CO_2$ sensor;
at least a second processing circuit operably coupled to receive information representative of $CO_2$ measurements generated by at least a second $CO_2$ sensor corresponding to a second space, the second processing circuit operable to control the flow of fresh air into the second space via the first damper of the second space based on the $CO_2$ measurements generated by the second $CO_2$ sensor;
first and second actuator modules, wherein first actuator module comprises the first processing circuit, and the second actuator module comprises the second processing circuit, the first actuator module further comprising a first wireless communication circuit communicating with a corresponding first wireless sensor module incorporating the first $CO_2$ sensor, the second actuator module further comprising a second wireless communication circuit communicating with a corresponding second wireless sensor module incorporating the second $CO_2$ sensor;
wherein each of the first and second actuator modules further includes a wireless network interface; and
wherein the first and second wireless sensor modules communicate with a control station for a building system via a corresponding one of the first and second actuator modules and a communication network, the control station including a user interface.

2. The arrangement of claim 1, wherein the first processing circuit is further configured to control the flow of other air into the first space via the second damper of the first space based on temperature measurements associated with the first space.

3. The arrangement of claim 2, wherein the first processing circuit includes a single processing device.

4. The arrangement of claim 1, wherein the first wireless communication circuit and the wireless network interface of the first actuator module employ different wireless communication methods.

5. The arrangement of claim 1, wherein the first processing circuit is further configured to cause the wireless network interface to communicate data corresponding to the information representative of the $CO_2$ measurements generated by the first $CO_2$ sensor to a third processing circuit using the communication network.

6. The arrangement of claim 5, further comprising the third processing circuit, and wherein the third processing circuit is further configured to adjust a third damper based on the data corresponding to the information representative of the $CO_2$ measurements generated by the first $CO_2$ sensor and data corresponding to information representative of the $CO_2$ measurements generated by a plurality of $CO_2$ sensors.

7. The arrangement of claim 1, wherein each of the wireless sensor modules further includes a MEMS flow sensor.

8. An arrangement for use in an occupancy-based ventilation system, comprising:
a plurality of $CO_2$ sensors distributed throughout a plurality of spaces in a building, each of the plurality of $CO_2$ sensors incorporated into a wireless sensor module, each of the plurality of $CO_2$ sensors comprising a MEMS sensor, each space having a corresponding first damper configured to regulate a flow of fresh air into the space and a second damper configured to regulate a flow of other air into the space, the other air having a temperature that is different than the fresh air, wherein each of the wireless sensor modules further includes a flow sensor that generates a flow measurement;

at least a first processing circuit operably coupled to receive information representative of $CO_2$ measurements corresponding to a first space generated by a first $CO_2$ sensor of a first wireless sensor module, the $CO_2$ measurements used in conjunction with flow measurements generated by a first flow sensor of the first wireless sensor module so as to determine occupancy as a function of both the $CO_2$ measurements and the flow measurements, the first processing circuit operable to control the flow of fresh air into the first space via the first damper of the first space based on the $CO_2$ measurements;

at least a second processing circuit operably coupled to receive information representative of $CO_2$ measurements generated by at least a second $CO_2$ sensor corresponding to a second space, the second processing circuit operable to control the flow of fresh air into the second space via the first damper of the second space based on the $CO_2$ measurements generated by the second $CO_2$ sensor; wherein the first and second $CO_2$ sensors communicate with a controller via the first and second processing circuits, respectively.

9. The arrangement of claim 8, further comprising first and second actuator modules, wherein first actuator module comprises the first processing circuit, and the second actuator module comprises the second processing circuit.

10. The arrangement of claim 9, wherein the first actuator module further comprises a wireless communication circuit configured to communicate with a corresponding wireless sensor module incorporating the first $CO_2$ sensor, and the second actuator module further comprises a wireless communication circuit configured to communicate with a corresponding wireless sensor module incorporating the second $CO_2$ sensor.

11. The arrangement of claim 10, wherein each of the first and second actuator modules further includes a wireless network interface configured to communicate with a third processing circuit.

* * * * *